United States Patent
Asao

(10) Patent No.: US 7,189,920 B2
(45) Date of Patent: Mar. 13, 2007

(54) METHOD FOR PRODUCING AN INSERT-MOLDED ARTICLE AND A MOLD ASSEMBLY THEREFOR

(75) Inventor: Kazuhiro Asao, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 11/096,157

(22) Filed: Mar. 31, 2005

(65) Prior Publication Data
US 2005/0218558 A1    Oct. 6, 2005

(30) Foreign Application Priority Data
Mar. 31, 2004    (JP) .............................. 2004-104240

(51) Int. Cl.
*H02G 3/08*    (2006.01)
*B29C 45/58*    (2006.01)

(52) U.S. Cl. .................. 174/50; 264/272.11; 264/275; 439/76.2; 425/577

(58) Field of Classification Search .................. 174/50, 174/59, 650, 651, 652, 653, 656, 152 G, 174/135; 220/3.2, 3.8, 4.02; 439/76.1, 76.2, 439/535; 29/592, 591; 264/272.11, 275; 425/577
See application file for complete search history.

(56) References Cited

U.S. PATENT DOCUMENTS 7,045,220 B2 *    5/2006    Ishiduka et al. ............... 174/50

FOREIGN PATENT DOCUMENTS

JP        2004-40945        2/2004

* cited by examiner

*Primary Examiner*—Angel R. Estrada
(74) *Attorney, Agent, or Firm*—Gerald E. Hespos; Anthony J. Casella

(57) ABSTRACT

An object of the present invention is to improve operability. Stoppers (74) are detachably mounted in a lower mold (70) of a mold. Nuts (30) are screwed down onto the stoppers (74) while being held upside down. After the mold is closed in this state and molten resin is filled into a cavity (77) and solidified therein, the mold is opened. The stoppers (74) are separated from the lower mold (70) as the mold is opened. When the stoppers (74) are separated from the nuts (30) thereafter, a casing 10 having no pin withdrawal hole can be obtained. Accordingly, it is not necessary to apply potting or the like to close the pin withdrawal hole.

7 Claims, 10 Drawing Sheets

METHOD FOR PRODUCING AN INSERT-MOLDED ARTICLE AND A MOLD ASSEMBLY THEREFOR

BACKGROUND OF THE INVENTION

1. Field of the Invention

The invention relates to a method for producing an insert-molded article and a mold assembly therefor.

2. Description of the Related Art

An electronic control unit has a casing made of a synthetic resin and a printed circuit board is mounted in the casing. Various electronic components and an electronic control circuit are disposed on the printed circuit board and in the casing. Japanese Unexamined Patent Publication No. 2004-40945 discloses a grounding path for such an electronic control unit.

The electronic control unit has a metal nut and a metal collar that are held in contact with an intermediate busbar. The casing is formed by insert molding using the metal nut and the metal collar as inserts. Thus, the metal nut, the intermediate busbar and the metal collar are embedded and are connected successively. The casing can be fixed to a body while a grounding wire from the electronic control circuit is connected with the metal nut. Thus, the grounding wire, the metal nut, the intermediate busbar and the metal collar are connected electrically with the body and are grounded.

The metal nut is set in the mold by supporting a bottom part of the metal nut on a resting pin that projects from the mold. However, a pin withdrawal hole is left below the bottom part of the nut when the pressing pin is withdrawn. Thus, a potting material is used to close the pin withdrawal hole and to provide airtightness after insert molding. The potting material adds to the cost for raw material and an additional operation load is required for potting.

The present invention is developed in view of the above problem, and an object thereof is to improve operability.

SUMMARY OF THE INVENTION

The invention relates to a method for producing an insert-molded article. The method includes mounting at least one stopper in or on a mold. The stopper is capable of locking an insert member. The method then includes engaging the insert member with the stopper to hold the insert member in position and to prevent loose movements of the insert member. The mold then is closed, and molten resin is filled at least partly into a cavity and solidified. The stopper then is separated from the insert member. Thus, no pin withdrawal hole is left in the molded article, and there is not need for potting or the like to close the pin withdrawal hole.

The at least one stopper preferably is capable of locking the insert member by the engagement of projections and recesses, and preferably by threaded engagement.

The stopper preferably is mounted detachably in or on the mold.

The mold preferably is opened until the insert member is separated from the stopper after the molten resin is filled at least partly into the cavity and solidified. The stopper preferably is separated from the mold as the mold is opened, thereby improving operational efficiency.

According to a preferred embodiment of the invention, the insert member is a nut spirally or threadingly engageable with the stopper.

The insert member preferably is a nut that is engageable with the stopper. The nut can be held easily and securely in position merely by being threadedly engaged with the stopper.

The invention also relates to a mold assembly for producing an insert-molded article. The assembly comprises a mold and at least one stopper capable of locking an insert member. The stopper is mounted in or on the mold and the insert member is engageable with the stopper to hold the insert member in position while preventing loose movements of the insert member. The mold is configured to be closeable in this state, and the stopper is separable from the insert member after molten resin is filled at least partly into a cavity and solidified therein.

The at least one stopper preferably is capable of locking the insert member by the engagement of projections and recesses or by threads.

The stopper preferably is detachably mountable in or on the mold.

The insert member preferably comprises a nut threadedly engageable with the stopper.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
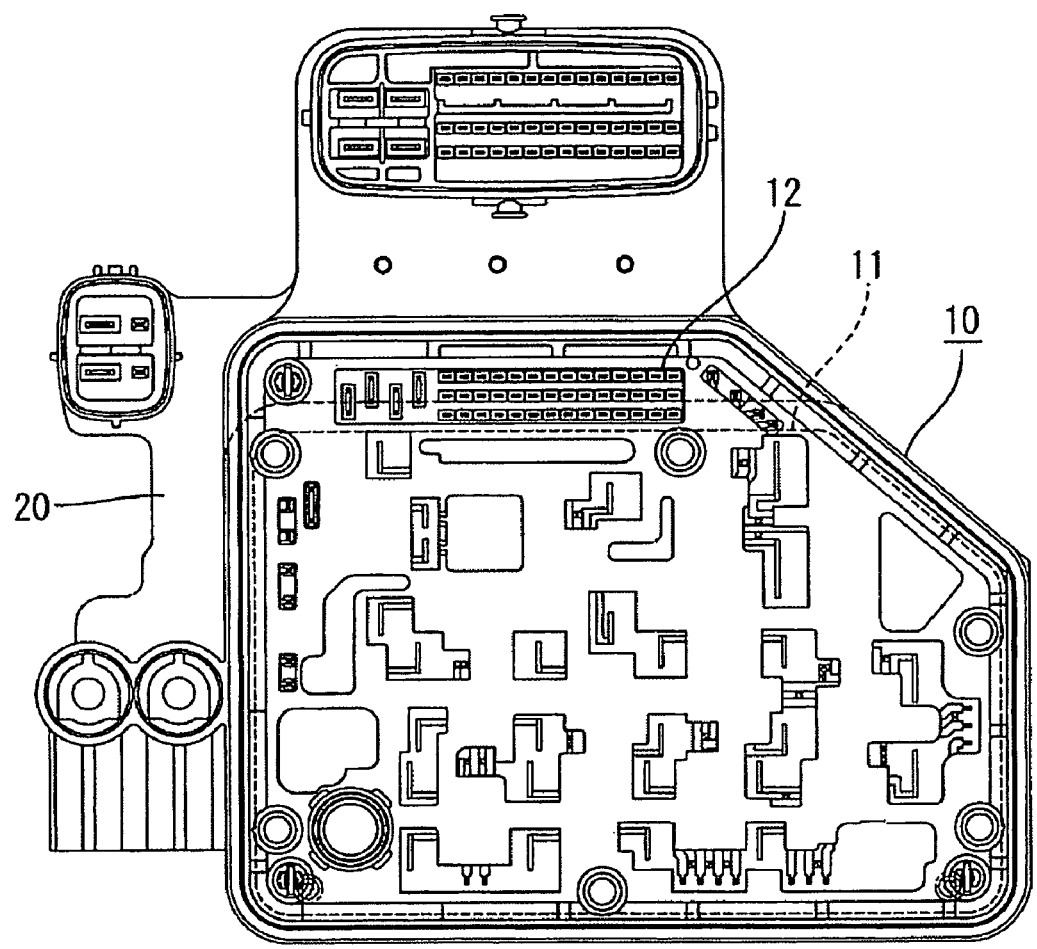
FIG. 1 is a plan view of a casing according to one embodiment of the present invention.

The method and molding assembly of the subject invention are described herein with respect to the manufacture of a casing for an electronic control unit. The casing is made e.g. of a synthetic resin and is identified by the numeral 10 in FIG. 1. The casing 10 is in the form of a box with an open top. At least one printed circuit board 11 and/or bus system is accommodated in the casing 10 and at least one circuit board connector, capacitor, fuse and/or other electrical or electronic component 12 is connected with the printed circuit board 11. An unillustrated cover is mounted on the casing 10 and the covered casing 10 is mounted on an unillustrated body.

Figure 9:
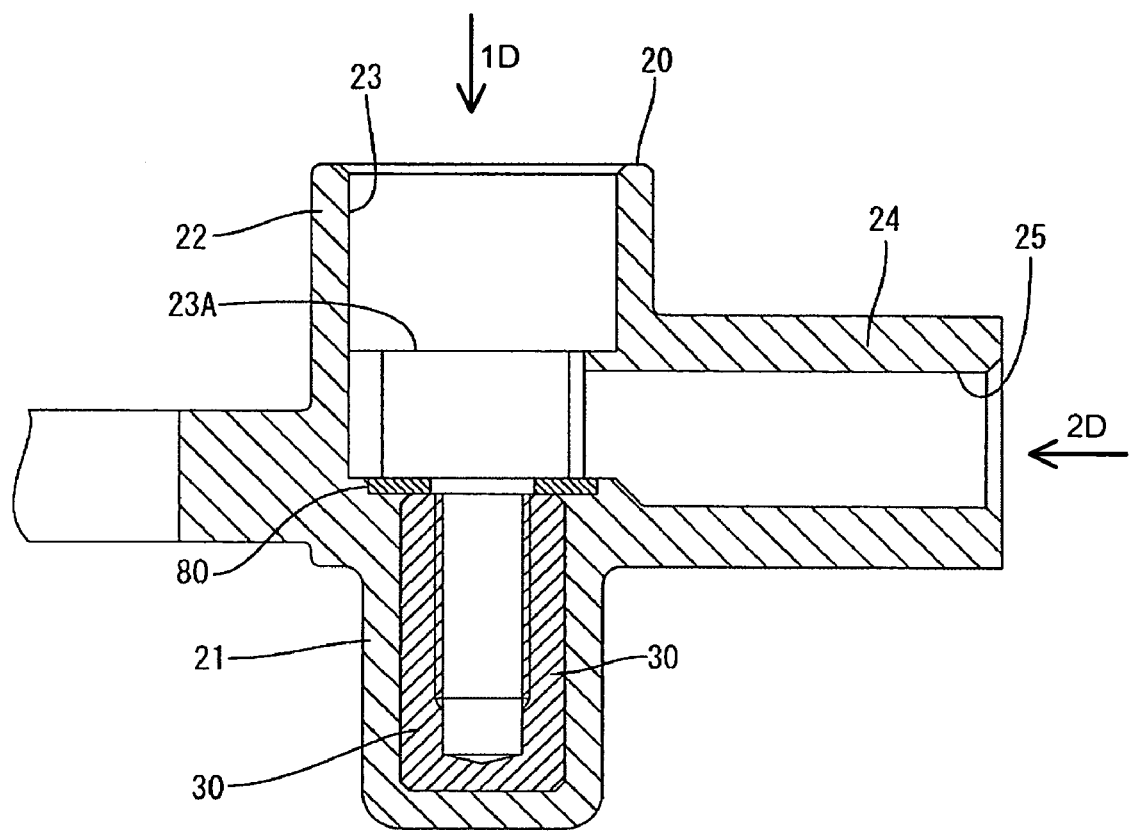
FIG. 9 is a section showing an essential portion.
Figure 10:
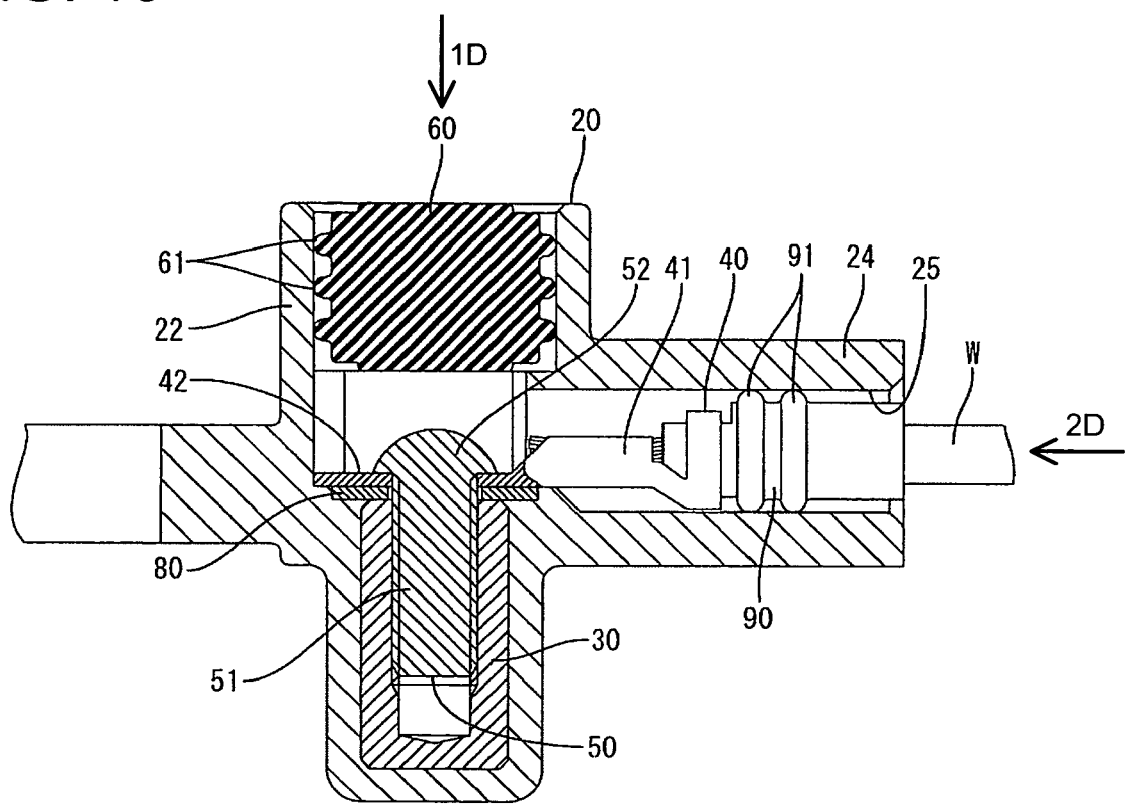
FIG. 10 is a section of an essential portion showing a state where terminal fittings and rubber plugs are mounted on wires.

A function portion 20 bulges out sideways from one sidewall of the casing 10. Long narrow metallic cap nuts 30 are at least partly embedded in the function portion 20, as shown in FIGS. 9 and 10, and can be connected respectively with two conductors. One of the conductors is a terminal fitting 40 connected with an end of a wire W that extends outside the casing 10. The other conductor is a busbar 80 that extends inside the casing 10.

Figure 2:
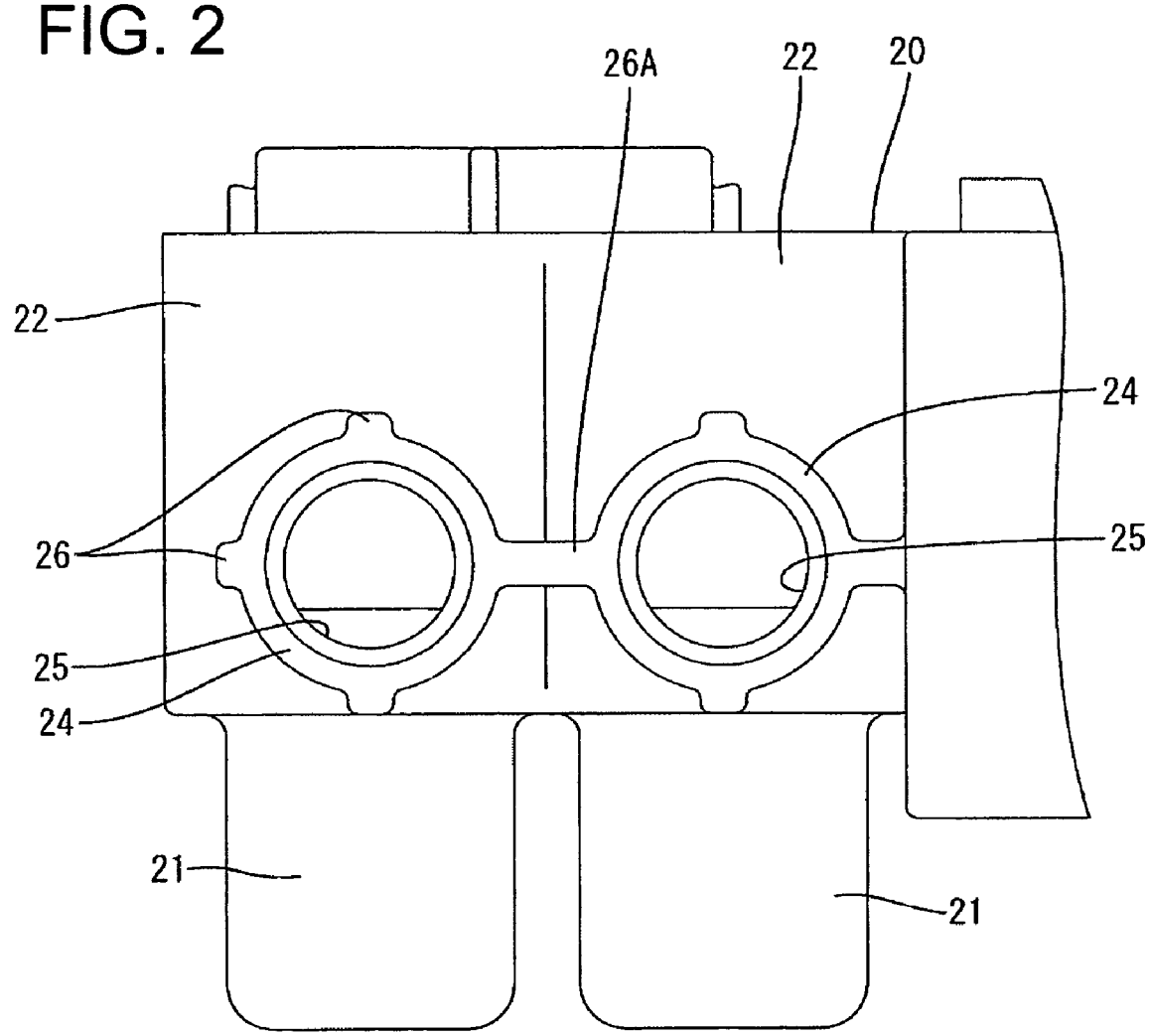
FIG. 2 is a front view showing an essential portion.

The nuts 30 are arranged substantially side by side and stand vertically in the function portion 20. As shown in FIGS. 2 and 9, the function portion 20 has first tubes 21 that correspond with the respective nuts 30. Each first tube 21 covers substantially all of the respective nut 30 except opening thereof. The function portion 20 also has second tubes 22 that are unitarily continuous with the first tubes 21. The second tubes 22 have introducing holes 23 that communicate from above with the openings of the nuts 30 and that are configured for receiving male screws. The function portion 20 also has third tubes 24 that are unitarily continuous with the first and second tubes 21, 22 and that extend transversely therefrom. The third tubes 24 have insertion holes 25 that communicate with the openings of the nuts 30 (see e.g. FIG. 9) and that are configured for receiving terminal fittings. The terminal fittings 40 are inserted into the insertion holes 25 of the third tubes 24 so that leading ends of the terminal fittings 40 face the openings of the nuts 30 from above.

The second tubes 22 are arranged vertically and open up. However, the third tubes 24 are arranged substantially normal to the second tubes 22 and open sideways. The introducing holes 23 extend substantially vertically along a first direction 1D in the second tubes 22 and the introducing holes 25 extend substantially horizontally along a second direction 2D in the third tubes 24. Thus, the first and second introducing holes 23 and 25 communicate with each other at substantially right angles above the openings of the nuts 30. The second tubes 22 are adjacent to each other and their ends are joined unitarily. Circumferentially spaced ribs 26 extend from the outer circumferential surface of each third tube 24. One rib 26A spans between and unitarily connects the adjacent third tubes 24.

A substantially cylindrical rubber plug 60 is fit into the introducing hole 23 of each second tube 22 after the male screw 50 is introduced. A plurality of circumferential lips 61 are provided on the outer circumferential surface of the rubber plug 60 and closely contact the inner wall of the introducing hole 23 to seal the introducing hole 23. A step 23A is provided at an intermediate position of the inner wall of each introducing hole 23 along the first direction 1D, and the rubber plug 60 is placed to abut the step 23A.

The terminal fitting 40 is formed by bending a metal plate to define a barrel 41 and a main portion 42 continuous with and in front of the barrel 41. The barrel 41 is configured to be crimped, bent or folded into connection with an exposed end section of the wire W. The main portion 42 is substantially flat and is arranged substantially normal to the first direction 1D. The leading end of the main portion 42 is substantially ring-shaped. Thus, a shaft 51 of the male screw 50 can be inserted through the ring-shaped main portion 42 and into the nut 30 when the main portion 42 is above the opening of the nut 30 (see e.g. FIG. 10). The busbar 80 has a ring-shaped first end disposed above the opening of the nut 30 and dimensioned to receive the shaft 51 of the male screw 50. The busbar 80 also has a second end arranged in the casing 10 for connection with a conductor path of the printed circuit board 11 or another electric/electronic device. An intermediate portion of the busbar 80 is embedded in the casing 10. The first end of the busbar 80 and the leading end of the main portion 42 are placed one over the other above the opening of the nut 30. As a result that the shaft 51 of the male screw 50 can be introduced through communicating holes to engage the nut 30.

A hollow cylindrical seal 90 is mounted on the insulation coating of the wire W behind a rear portion of the terminal fitting 40. Two annular lips 91 are formed on the outer circumferential surface of the seal 90. The lips 91 closely contact and seal with the inner wall of the insertion hole 25.

Figure 3:
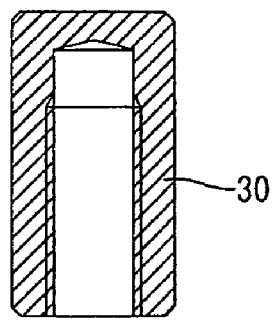
FIG. 3 is a section showing a state before nuts are engaged with stoppers.
Figure 3:
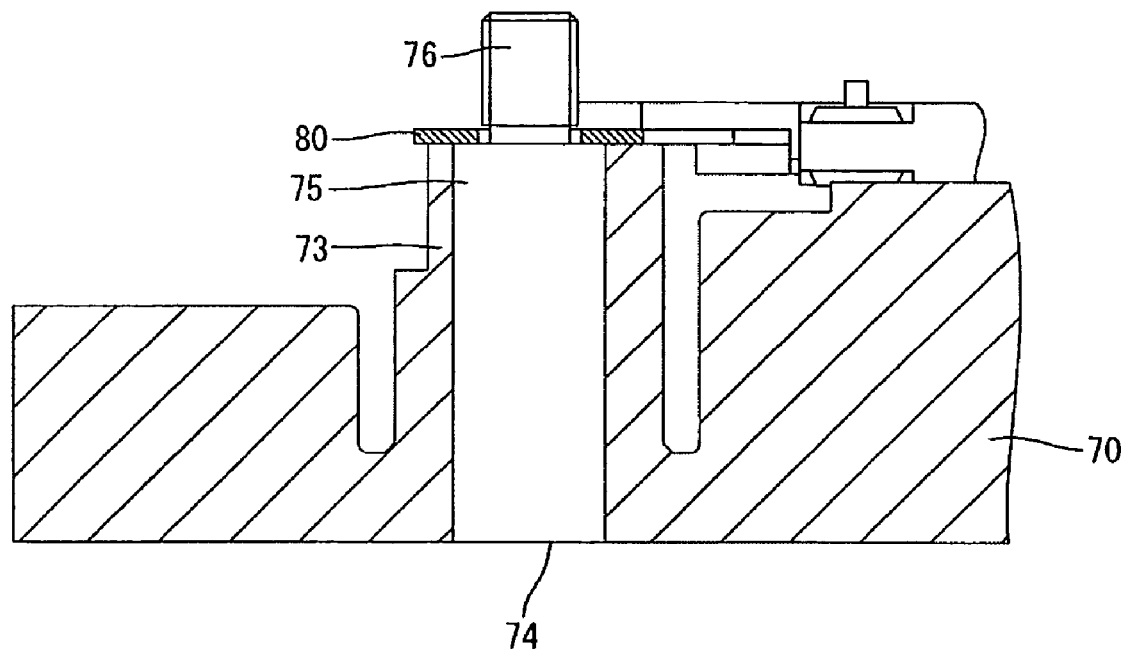
Figure 5:
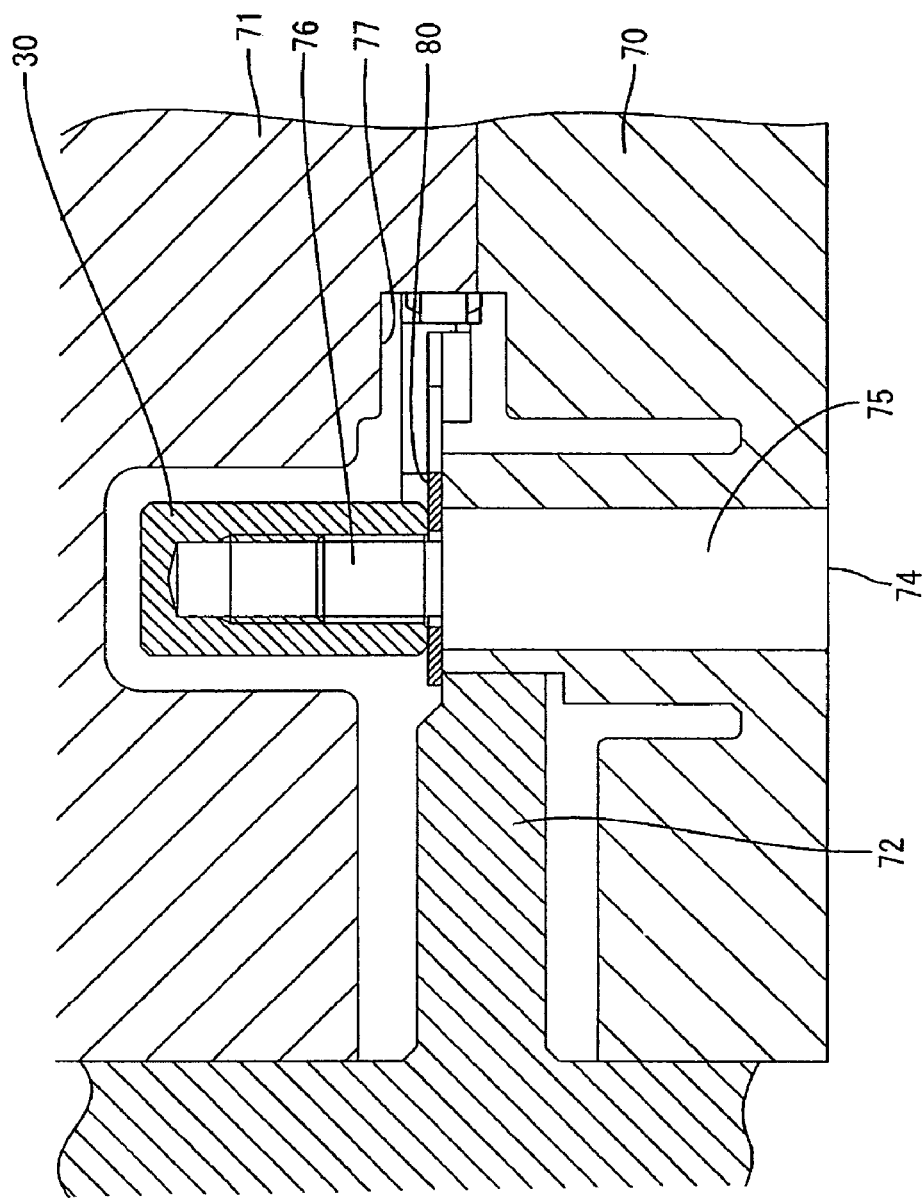
FIG. 5 is a section showing a state where a mold is closed.

A mold assembly for insert molding is shown in FIG. 5. The mold assembly has a first mold 70, a second mold 71 and a slidable mold 72. The second mold 71 is movable along a first moving direction 1MD towards and away from the first mold 70. The slidable mold 72 is movable sideways along a second moving direction 2MD substantially normal to the first moving direction 1MD. The slidable mold 72 is used to form the insertion holes 25 of the third tubes 24 and is shaped in conformity with shapes of the insertion holes 25. As shown in FIG. 3, the lower mold 70 has support columns 73 for forming the introducing holes 23 of the second tubes 22.

A stepped cylindrical stopper 74 penetrates each support column 73 and has a plurality of diameters along the moving direction MD1. Each stopper 74 has a fixing portion 75 at least partly embedded in the support column 73. A screw 76 is continuous with the upper end of the fixing portion 75 and has a diameter smaller than the fixing portion 75. An external thread is formed on the screw 75 and is spirally engageable with the nut 30. The stopper 74 is slidable along the moving direction MD1 and relative to the support column 73. Thus, the fixing portion 75 can project from and retract into the upper surface of the support column 73. The nut 30 is screwed down onto the screw 76 of the stopper 74 to prevent loose movements of the nut 30 in response to pressure from the resin during insert molding. A projecting distance of the screw 76 is shorter than the shaft 51 of the male screw 50 and the screw 76 is engaged only with a part of an internally threaded area of the nut 30.

Figure 4:
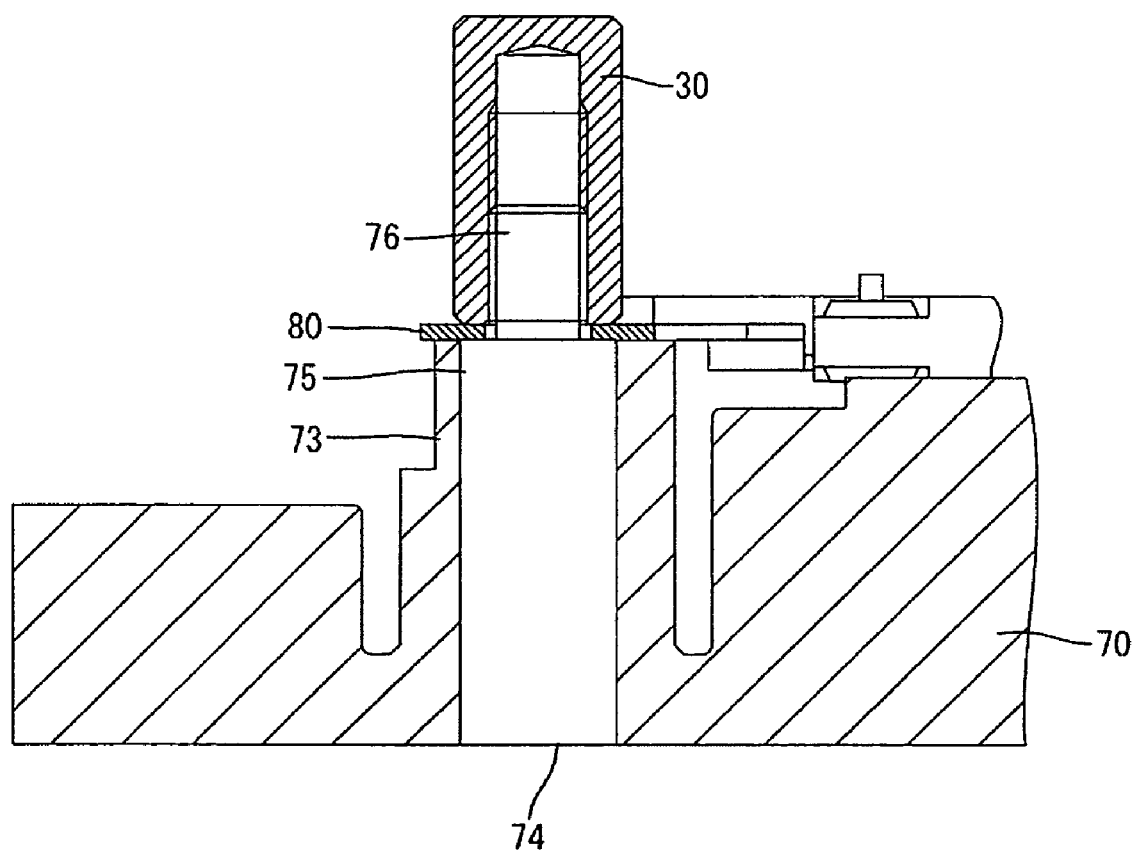
FIG. 4 is a section showing a state where the nuts are engaged with the stoppers.
Figure 6:
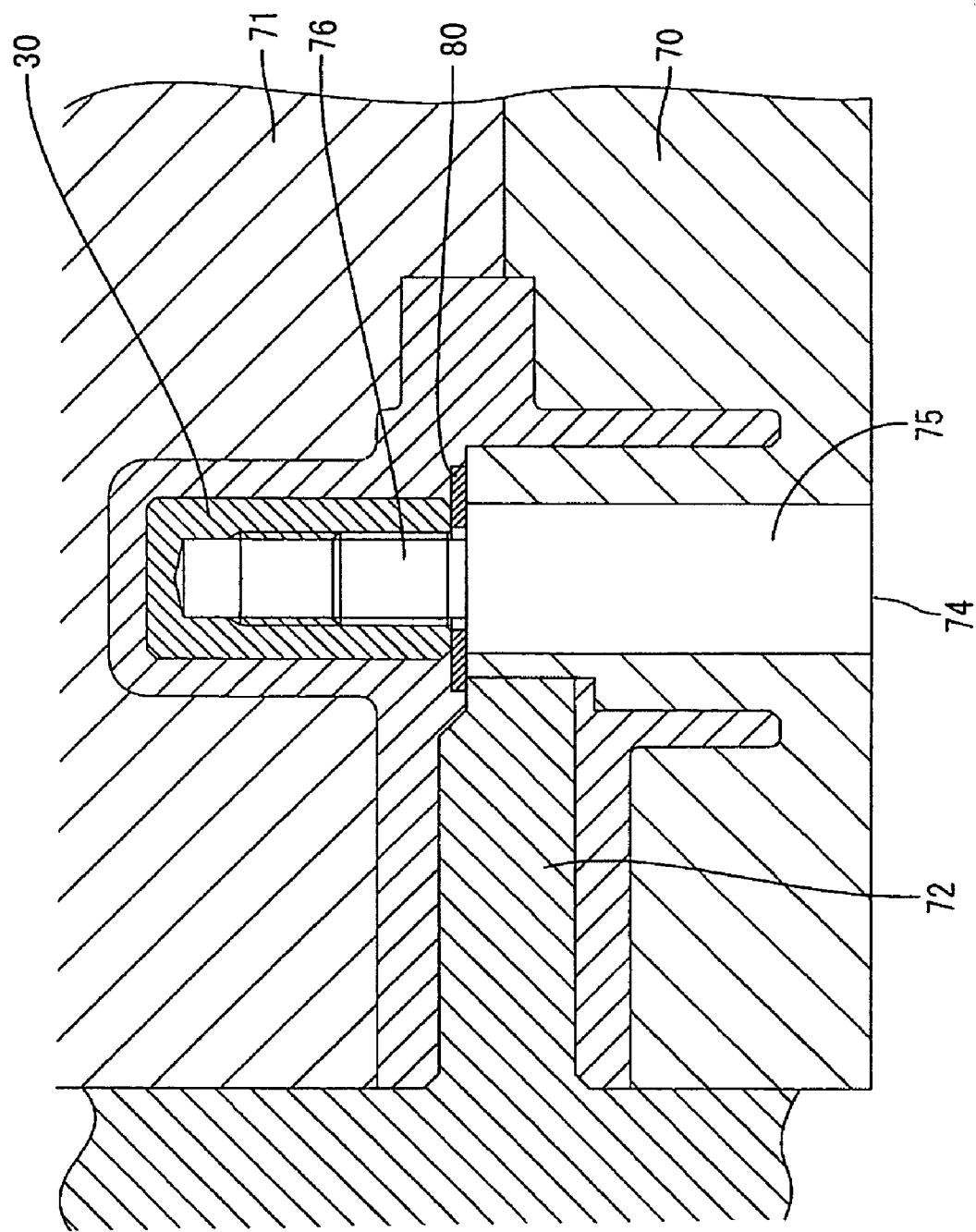
FIG. 6 is a section showing a state where a resin is filled in a cavity.
Figure 7:
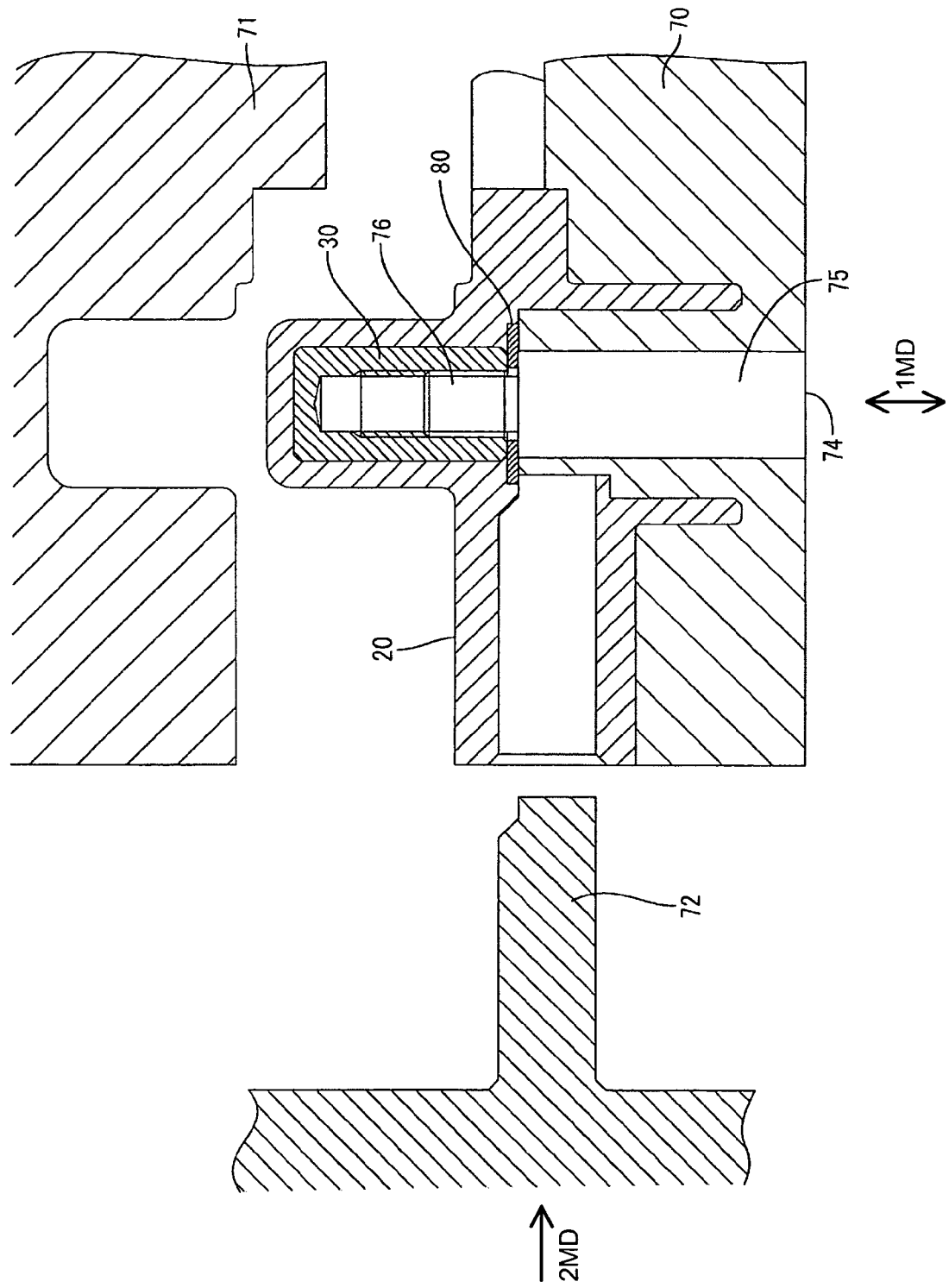
FIG. 7 is a section showing a state where an upper and a lower molds are separated.

The first end of each busbar 80 is fit on the screw 76 of the corresponding stopper 74. Each nut 30 then is turned upside down and screwed down until the leading end surface of the nut 30 contacts the upper surface of the busbar 80, as shown in FIG. 4. As a result, the nut 30 is held in position and loose movements are prevented. The slidable mold 72 then is moved and the upper mold 71 is lowered to close the mold, as shown in FIGS. 5 and 6. Molten resin then is injected and filled into a cavity 77 of the mold to form the function portion 20.

Figure 8:
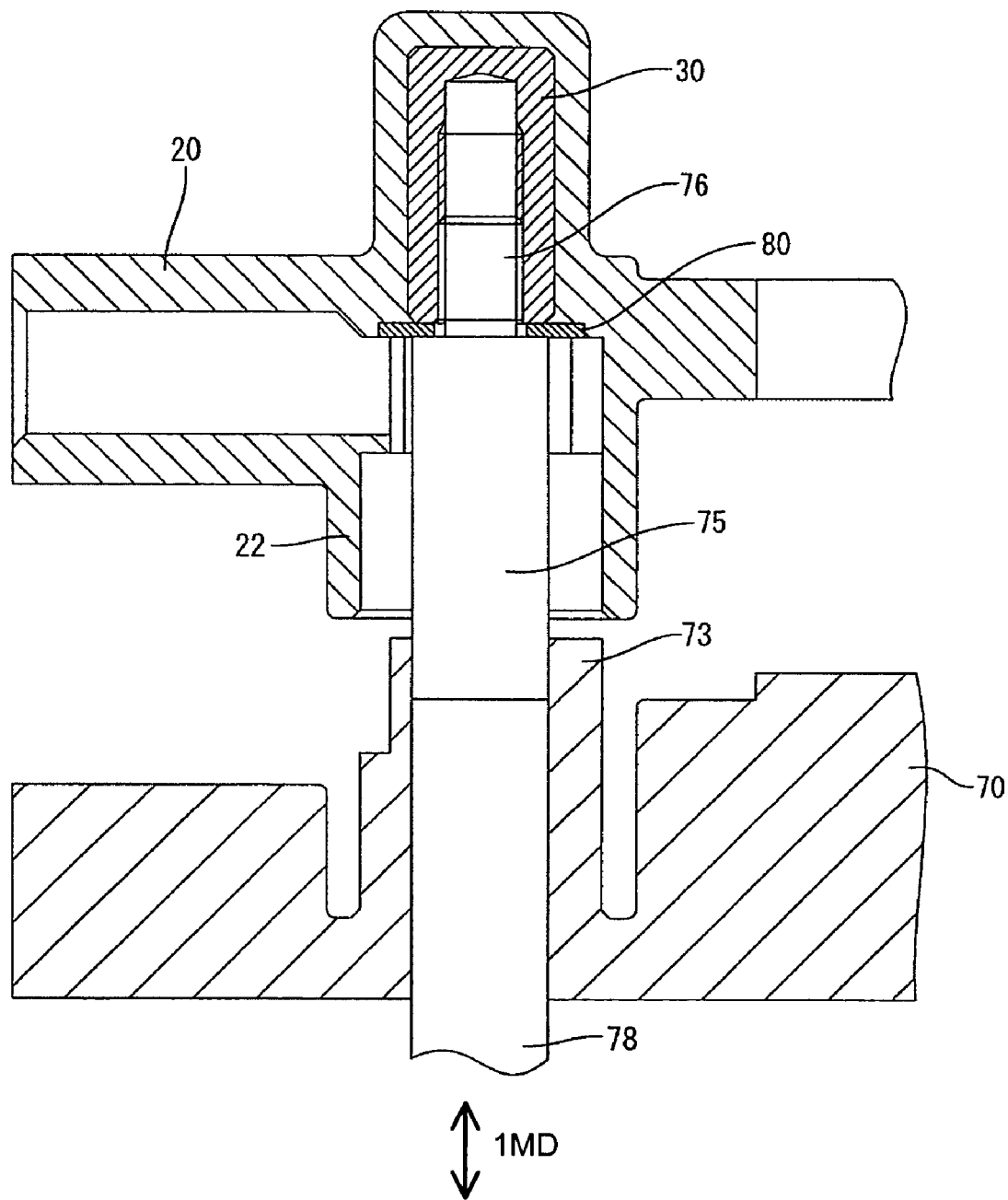
FIG. 8 is a section showing a state where a molded article can be taken out by means of ejector pins.

The mold is opened after the synthetic resin has cooled and solidified. Ejector pins 78 then push the stoppers 74 up, as shown in FIG. 8, and the second tubes 22 are removed from the support columns 73. The entire casing 10, including the function portion 20, then can be taken out of the mold. The molded article then is turned upside down and the stoppers 74 are turned and separated from the nuts 30 to complete the casing 10.

The seals 90 are mounted on the wires W and the terminal fittings 40 are crimped into connection with the ends of the wires W and the seals 90. The terminal fittings 40 then are inserted into the insertion hole 25 of the corresponding second tube 22 so that the main portion 42 of the terminal fitting 40 is placed on the first end of the busbar 80. The screw 50 then is inserted in the opening of the introducing hole 23. The shaft 51 of the screw 50 passes through the leading end of the terminal fitting 40, through the first end of the busbar 80 and into the nut 30. The screw 50 then is tightened so that the terminal fitting 40 and the busbar 80 are squeezed between the head 52 of the screw 50 and the nut 30 along the first direction 1D. In this way, the terminal fitting 40 and the busbar 80 are connected electrically. The rubber plug 60 is fit into the introducing hole 23 of the second tube 22 in the first direction 1D after this screw-fastening is completed to seal the introducing hole 23 hermetically. Further, the insertion hole 25 of the third tube 24 is sealed hermetically by the seal 90 mounted on the terminal fitting 40.

As described above, the nuts 30 are screwed at least partly onto the stoppers 74 mounted in the first mold 70 and are held in position while having loose movements thereof prevented. The mold then is closed and the molten resin is filled into the cavity 77. The stoppers 74 are separated from the nuts 30 after the resin is solidified. Thus, no pin withdrawal hole is left, and there is no need for potting or the like to close the pin withdrawal holes.

The molten resin is filled into the cavity and solidified therein. The mold then is opened and the stoppers 74 are separated from the lower mold 70 as the mold is opened. Thus, the lower mold 70 does not accompany the stoppers 74 upon separating the stoppers 74 from the nuts 30, and operability is even better.

The invention is not limited to the above described and illustrated embodiment. For example, the following embodiments are also embraced by the technical scope of the present invention as defined by the claims. Beside the following embodiments, various changes can be made without departing from the scope and spirit of the present invention as defined by the claims.

The stoppers are mounted in the mold and the nuts are inserts assembled with the stoppers in the foregoing embodiment. However, the nuts may be mounted in the mold and the stoppers may be the inserts assembled with the nuts according to the invention.

The fastening nuts for connecting the terminal fittings and the busbars are used as inserts in the foregoing embodiment. However, other nuts or the like may be used as inserts instead of the inserts having the above-described function.

The stoppers are mounted detachably in the mold in the foregoing embodiment. However, the stoppers may be fixed to the mold according to the present invention.

What is claimed is:

1. A method for producing an insert-molded article comprising:
    providing at least one stopper having an end with an array of external threads;
    mounting the stopper in a mold,
    providing an insert with an external surface and an internal surface, the internal surface having an array of internal threads engageable with the external threads of the stopper;
    engaging the internal threads of the insert with the external threads of the stopper to hold the insert in position and preventing loose movements of the insert;
    closing the mold,
    at least partly filling a cavity of the mold with a molten resin so that the molten resin surrounds the external surface of the insert, and solidifying the molten resin in the mold; and
    separating the stopper from the insert.

2. The method of claim 1, wherein the step of mounting the stopper comprises detachably mounting the stopper to the mold.

3. The method of claim 2, further comprising opening the mold after the molten resin is solidified in the cavity.

4. The method of claim 3, further comprising separating the stopper from the mold as the mold is opened.

5. The method of claim 4, wherein the step of separating the stopper from the insert is carried out after the stopper is separated from the mold.

6. A mold assembly for producing an insert-molded article, comprising:
    a mold;
    at least one stopper detacheably mountable in the mold and having an end portion with an array of external threads configured for holding an insert in a specified substantially fixed position in the mold; and
    the mold being configured to be closeable with the stopper and the insert therein, and the stopper being unthreadable from the insert after molten resin is at least partly filled into a cavity of the mold and solidified therein.

7. The mold assembly of claim 6, wherein the insert comprises a nut threadedly engageable with the stopper.

* * * * *